(12) United States Patent
Kwon et al.

(10) Patent No.: US 8,285,207 B2
(45) Date of Patent: Oct. 9, 2012

(54) METHOD AND APPARATUS FOR PEER TO PEER CONNECTION IN WIRELESS COMMUNICATION SYSTEM

(75) Inventors: Il-Won Kwon, Ansan-si (KR); Yung-Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 12/169,412

(22) Filed: Jul. 8, 2008

(65) Prior Publication Data

US 2009/0017855 A1 Jan. 15, 2009

(30) Foreign Application Priority Data

Jul. 9, 2007 (KR) .................. 10-2007-0068784

(51) Int. Cl.
*H04B 7/00* (2006.01)
(52) U.S. Cl. ....... 455/41.2; 455/509; 455/517; 455/416; 455/3.05; 455/127.5; 370/338
(58) Field of Classification Search .................. 455/41.2, 455/509, 519, 518, 517, 425, 416, 3.05, 127.5, 455/522, 13.4; 370/338
See application file for complete search history.

(56) References Cited

U.S. PATENT DOCUMENTS

| 5,903,618 A * | 5/1999 | Miyake et al. ................. 375/356 |
| 2005/0147044 A1 * | 7/2005 | Teodosiu et al. ............. 370/236 |
| 2005/0239451 A1 | 10/2005 | Periyalwar et al. |
| 2007/0129076 A1 | 6/2007 | Cho et al. |
| 2009/0016232 A1 * | 1/2009 | Kwon et al. .................. 370/252 |
| 2009/0017858 A1 * | 1/2009 | Kwon et al. .................. 455/519 |

FOREIGN PATENT DOCUMENTS

KR 10-2005-0101491 A 10/2005

OTHER PUBLICATIONS

H.-Y. Hsieh and R. Sivakumar, On Using Peer-to-Peer Communication in Cellular Wireless Data Networks, IEEE Trans. Mobile Comput., vol. 3, No. 1, pp. 57-72, Jan. 2004.

* cited by examiner

*Primary Examiner* — Shaima Q Aminzay
(74) *Attorney, Agent, or Firm* — Jefferson IP Law, LLP

(57) ABSTRACT

A method and apparatus for establishing a Peer-to-Peer (P2P) connection between Mobile Stations (MSs) in a wireless communication system are provided. A method of operating a transmitting MS for establishing the P2P connection between the MSs in the wireless communication system includes when a location of a receiving MS is not known, requesting a Base Station (BS) to transmit a message instructing MSs to prepare for P2P setup, and thereafter, broadcasting to neighbor MSs a message requesting P2P-related information, receiving the P2P-related information from each of the neighbor MSs, generating a list of MSs capable of P2P communication using the received P2P-related information, and establishing a P2P connection by selecting the receiving MS from the list of MSs with which P2P communication is desired. Accordingly, in an environment where the location of the receiving MS is not known, the receiving MS can be found and thus the P2P connection can be established. Therefore, subscribers of P2P communication can be easily managed by the BS.

22 Claims, 6 Drawing Sheets

METHOD AND APPARATUS FOR PEER TO PEER CONNECTION IN WIRELESS COMMUNICATION SYSTEM

PRIORITY

This application claims the benefit under 35 U.S.C. §119(a) of a Korean patent application filed in the Korean Intellectual Property Office on Jul. 9, 2007 and assigned Serial No. 2007-68784, the entire disclosure of which is hereby incorporated by reference.

BACKGROUND OF THE INVENTION

1. Field of the Invention

The present invention relates to a method and apparatus for establishing a Peer-to-Peer (P2P) connection between Mobile Stations (MSs) in a wireless communication system. More particularly, the present invention relates to a method and apparatus for establishing a P2P connection between MSs that share resources of the wireless communication system instead of using separate P2P communication resources in order to perform P2P communication.

2. Description of the Related Art

In a wireless communication system, in order to communicate with other Mobile Stations (MSs), a transmitting MS makes a call to a receiving MS through a wireless communication network regardless of a distance from the receiving MS. That is, a connection with the receiving MS is established via a Base Station (BS), a mobile switching center, or the like constituting the wireless communication network regardless of the distance between the transmitting MS and the receiving MS. However, if the distance between the transmitting MS and the receiving MS is very close, a direct communication not through the BS may be more appropriate. Direct communication is referred to as Peer-to-Peer (P2P) communication. Various services can be provided through the P2P communication, such as, transmission of a file, Voice over Internet Protocol (VoIP), video conference, etc. The P2P communication can provide the same service quality as that conventionally provided by the BS.

The MSs use a frequency band for P2P communication that is different from a frequency band allocated to the wireless communication system for communication by the BS. In addition, to process the additional frequency band, a separate Radio Frequency (RF) transmitting/receiving apparatus is used. For example, Infrared Data Association (IrDA) communication, Bluetooth communication, etc., are used in the P2P communication. When the P2P communication and the wireless communication use the same frequency band, bandwidth efficiency can be further improved by flexibly adjusting each transmission band, if interference is present, through effective resource management. Research on P2P communication in association with a Wireless world Initiative NEw Radio (WINNER) system is currently in progress in Europe.

When an MS is initialized for P2P communication, two types of initialization can be considered according to a location and type of a counterpart MS and a characteristic of the data requested. That is, in a first case, the MS knows a location of the counterpart MS, and in a second case, the MS does not know the location of the counterpart MS. If a unique number or location of a counterpart MS is known, P2P initialization can be performed with relative simplicity. However, if the P2P communication is desired with one of a plurality of unspecified MSs or if the unique number of a counterpart MS is known but the location thereof is not known, the initialization may be relatively complex. In other words, since a transmitting MS does not know information (e.g., a location, a state, a reception availability, etc) about a receiving MS, in some cases, initialization cannot be performed for P2P communication.

SUMMARY OF THE INVENTION

An aspect of the present invention is to address at least the above-mentioned problems and/or disadvantages and to provide at least the advantages described below. Accordingly, an aspect of the present invention is to provide a method and apparatus for establishing a Peer-to-Peer (P2P) connection between Mobile Stations (MSs) in a wireless communication system.

In accordance with an aspect of the present invention, a method of operating a transmitting MS for establishing a P2P connection between MSs in a wireless communication system is provided. The method includes when a location of a receiving MS is not known, requesting a Base Station (BS) to transmit a message instructing MSs to prepare for P2P setup, and thereafter, broadcasting to neighbor MSs a message requesting P2P-related information, receiving the P2P-related information from each of the neighbor MSs, generating a list of MSs capable of P2P communication using the received P2P-related information, and establishing a P2P connection by selecting the receiving MS from the list of MSs with which P2P communication is desired.

In accordance with another aspect of the present invention, a method of operating a receiving MS for establishing a P2P connection between MSs in a wireless communication system is provided. The method includes after receiving from a Base Station (BS) a message instructing to prepare for P2P setup, receiving a message requesting P2P-related information from a transmitting MS, transmitting the P2P-related information to the transmitting MS, and establishing a P2P connection with the transmitting MS.

In accordance with another aspect of the present invention, a method of operating a BS for establishing a P2P connection between MSs in a wireless communication system is provided. The method includes broadcasting a message instructing MSs to prepare for P2P setup after receiving from a transmitting MS a message requesting transmission of the message instructing MSs to prepare for P2P setup, receiving information on a receiving MS selected by the transmitting MS, and allocating resources for maintaining P2P communication between the transmitting MS and the receiving MS.

In accordance with another aspect of the present invention, a transmitting MS apparatus for establishing a P2P connection between MSs in a wireless communication system is provided. The apparatus includes a P2P setup unit for broadcasting to neighbor MSs a message requesting P2P-related information after requesting a Base Station (BS) to transmit a message instructing MSs to prepare for P2P setup, when a location of a receiving MS is not known, a P2P communication manager for receiving the P2P-related information from each of the neighbor MSs and for generating a list of MSs capable of P2P communication using the received P2P-related information, and a P2P controller for establishing a P2P connection by selecting the receiving MS from the list of MSs with which P2P communication is desired.

In accordance with another aspect of the present invention, a receiving MS apparatus for establishing a P2P connection between MSs in a wireless communication system is provided. The apparatus includes a P2P setup unit for receiving a message requesting P2P-related information from a transmitting MS after receiving from a Base Station (BS) a message instructing to prepare for P2P setup and for transmitting the P2P-related information to the transmitting MS, and a P2P controller for establishing a P2P connection with the transmitting MS.

In accordance with another aspect of the present invention, a BS apparatus for establishing a P2P connection between MSs in a wireless communication system is provided. The apparatus includes a P2P relay setup unit for broadcasting a message instructing MSs to preparing for P2P setup after receiving a message from a transmitting MS requesting transmission of the message instructing MSs to prepare for P2P setup, a P2P information manager for receiving information on a receiving MS selected by the transmitting MS, and a controller for allocating resources for maintaining P2P communication between the transmitting MS and the receiving MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions will be omitted for clarity and conciseness.

Hereinafter, an apparatus and method for establishing a Peer-to-Peer (P2P) connection between Mobile Stations (MSs) will be described by considering a case where a location of a counterpart MS for P2P communication is known and a case where the location thereof is not known.

Figure 1:
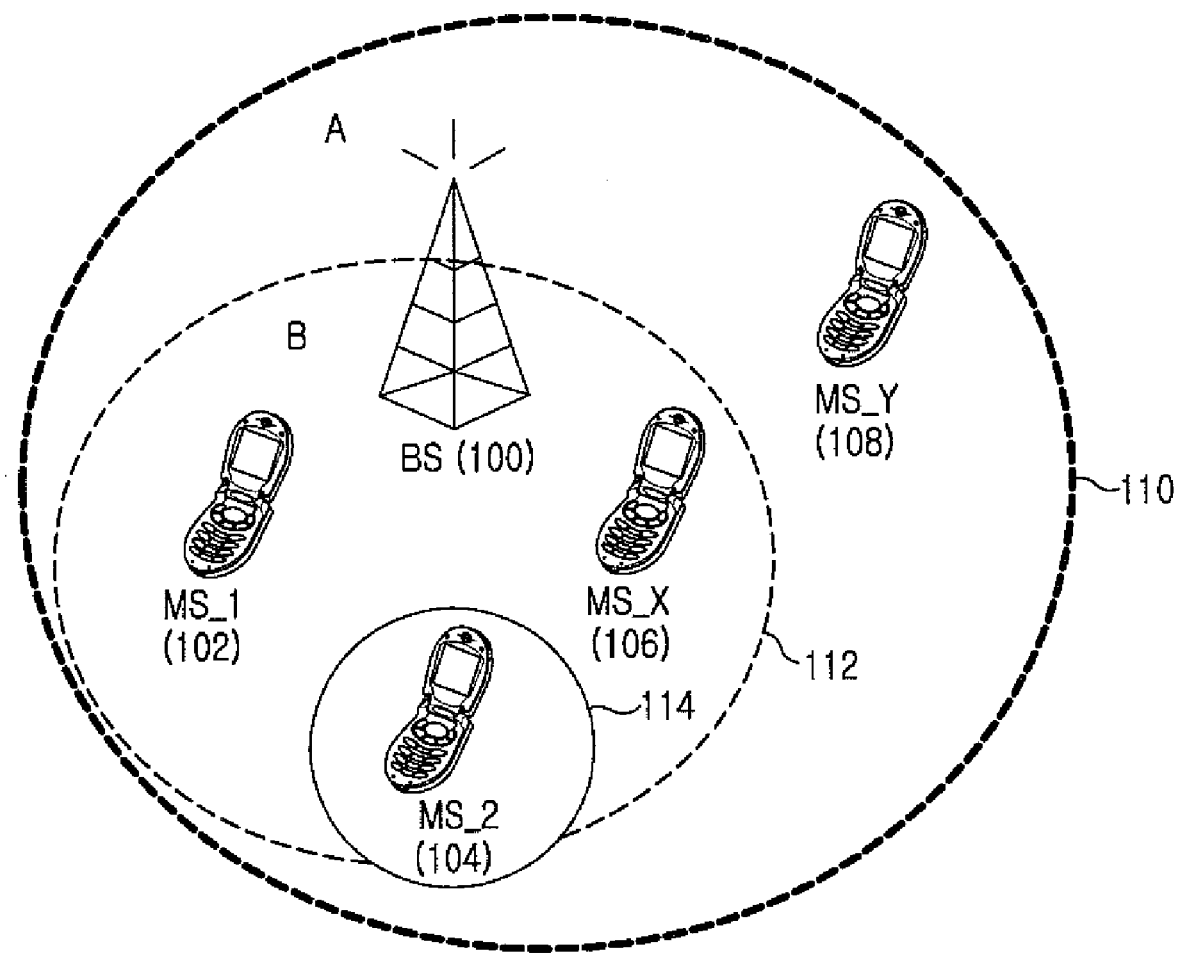
FIG. 1 illustrates an example of Peer-to-Peer (P2P) communication in a wireless communication system according to an exemplary embodiment of the present invention.

FIG. 1 illustrates an example of P2P communication in a wireless communication system according to an exemplary embodiment of the present invention.

Referring to FIG. 1, a plurality of MSs 102 to 108 are located in a service area 110 (indicated by A) of a Base Station (BS) 100, and the MS_1 102 desires P2P communication with the MS_2 104 within a cell area 112 (indicated by B). The MS_1 102 may not know a location of the MS_2 104. In addition, some MSs (e.g., the MS_y 108) may be located in an area to which a radio wave transmitted by the MS_1 102 cannot reach. In this case, P2P communication cannot be achieved. To make the P2P communication possible, the MS_1 102 must acquire location information of the MS_2 104.

In other words, when a transmitting MS requests to send a specific file, Software (SW) or content through P2P communication with one of a plurality of unspecified receiving MSs neighboring the transmitting MS, or when the transmitting MS does not know a location of a counterpart MS for P2P communication, the transmitting MS must determine which MSs are located around the transmitting MS in order to attempt to establish a P2P connection. For example, when the MS_1 102 does not know the location of the MS_2 104, the MS_1 102 first requests the BS 100 to setup the neighbor MSs for P2P so that the neighbor MSs detect a P2P request signal. Upon receiving the request to setup P2P from the MS_1 102, the BS 100 instructs all MSs 104 to 108 included within its service cell to detect the P2P request signal. Thereafter, the MS_1 102 broadcasts a P2P communication broadcast message (i.e., a Direct P2P Neighbor Report (DPNR) or the like) to its neighbor MSs, i.e., the MS_1 102, the MS_x 106, and the MS_y 108. Further, the MS_1 102 gathers information required for P2P communication from its neighbor MSs, i.e., the MS_2 104 and the MS_x 106. In this case, since the MS_y 108 is located outside the range of the MS_1 102, the MS_y 108 cannot receive the DPNR message and thus will not transmit its information to the MS_1 102. Thereby the MS_1 102 can determine which MSs are located nearby from the gathered information, and thus establishes a P2P connection with the MS_2 104. A P2P connection process will be described below in detail with reference to FIG. 2.

Figure 2:
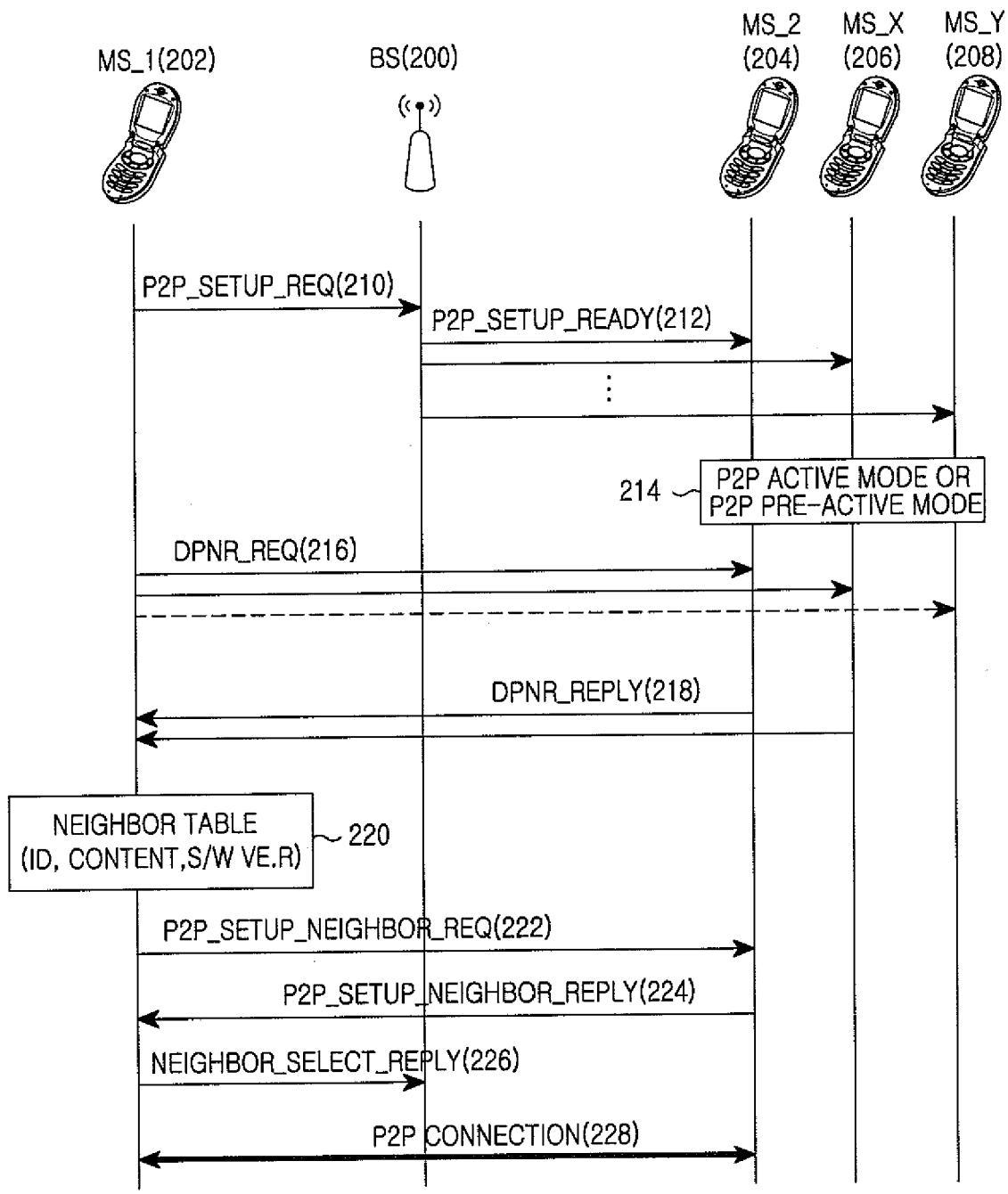
FIG. 2 is a flow diagram illustrating a process for establishing a P2P connection between Mobile Stations (MSs) in a wireless communication system according to an exemplary embodiment of the present invention.

FIG. 2 is a flow diagram illustrating a process for establishing a P2P connection between MSs in a wireless communication system according to an exemplary embodiment of the present invention.

Referring to FIG. 2, if a transmitting MS_1 202 does not know a location of a receiving MS_2 204, the transmitting MS_1 202 transmits a P2P_setup_req message to a BS 200 in order to begin finding the receiving MS_2 204 in step S210.

In step 212, upon receiving the P2P_setup_req message, the BS 200 broadcasts or pages a P2P_setup ready message to all MSs, including MS_2 204, MS_x 206, and MS_y 208, located within a service area of the BS 200 so that these MSs are switched into one of a P2P active mode and a P2P pre-active mode in step 214.

In this case, the MS_2 204, MS_x 206, and MS_y 208 located within a specific cell area can receive the P2P_setup_ready message when in a sleep mode in which no communication is occurring with the BS 200 or when in a state in which communication is ongoing with another MS. In the former case, the MS shifts from the sleep mode to the P2P active mode in step 214 when the message is received, and thus power consumed in the MSs can be effectively reduced. In the latter case, after receiving the P2P_setup_ready message, a first MS communicating with a second MS enters a state in step 214 in which P2P communication can be achieved with a transmitting MS in P2P communication while maintaining communication with the second MS. Such a connection in the context of P2P communication will be referred to as P2P pre-active mode. When in the P2P-pre-active mode, an MS always detects a P2P request signal of a neighboring MS which is a transmitting MS in P2P communication. Thus, upon receiving the P2P request message, without having to perform a P2P connection setup process, the MS monitors a P2P connection request message after receiving the P2P_setup_req message from the BS. As a result, power consumed in the P2P connection process can be reduced.

In step 216, the transmitting MS 200 broadcasts a Direct P2P Neighbor Report_req (DPNR_req) message to gather information on its neighbor MSs. According to an exemplary embodiment, the transmitted DPNR message may be multicast.

In step 218, in response to the DPNR_req message, the neighbor MS_2 204 and MS_x 206 transmit a DPNR_reply message directly to the transmitting MS_1 202 and not through the BS 200. The DPNR_reply message includes information indicating whether P2P communication is available and information on specific SW or content. In a case similar to what is illustrated in FIG. 1, if the MS_y 208 is located far from the transmitting MS_1 202 it will not be able to directly receive the DPNR_req message. Therefore, the MS_y 208 will not transmit the DPNR_reply message to the transmitting MS_1 202.

In step 220, the transmitting MS_1 202 gathers information that is included in the DPNR_reply message received from the MS_2 204 and MS_y 206 and determines and manages a list of neighbor MSs located within a P2P communicable distance in the same cell. The DPNR_reply message includes a variety of information such as an indication of a transmit/receive power of each MS, a distance between a transmitting MS and a receiving MS capable of P2P communication, a presence/absence of required specific content, a required specific SW version, a telephone call reception state, etc. Upon receiving such information, the transmitting MS_1 202 selects a specific MS by using the information and attempts to establish a P2P connection.

In step 222, the transmitting MS 200 determines whether the receiving MS_2 204 is included in the list of the neighbor MSs located within the P2P communicable distance, and then transmits directly to the receiving MS_2 204 a P2P_setup_neighbor_req message for requesting setup of the P2P connection. If the transmitting MS_1 202 desires P2P communication with a plurality of unspecified MSs, the transmitting MS_1 202 may multicast the P2P_setup_neighbor_req message to the MSs included in the list.

In step 224, the receiving MS_2 204 transmits a P2P_setup_neighbor_reply message to the transmitting MS_1 202 in response to the P2P_setup_neighbor_req message.

In step 226, upon receiving the P2P_setup_neighbor_reply message, the transmitting MS_1 202 transmits a neighbor_select_reply message to the BS 200. Upon receiving the neighbor_select_reply message, the BS 200 allocates resources so that P2P communication can be maintained between the transmitting MS_1 202 and the receiving MS_2 204, and also manages a P2P group list.

In step 228, the BS 202 allocates P2P resources to the transmitting MS_1 202, and then the transmitting MS_1 202 establishes a P2P connection with the receiving MS_2 204.

In an initial P2P connection, if the transmitting MS_1 202 can establish P2P communication in a face-to-face manner, returning to step 222, the transmitting MS_1 202 transmits the P2P_setup_neighbor_req message to the receiving MS_2 204, and then performs the subsequent steps 224 to 228.

Figure 3:
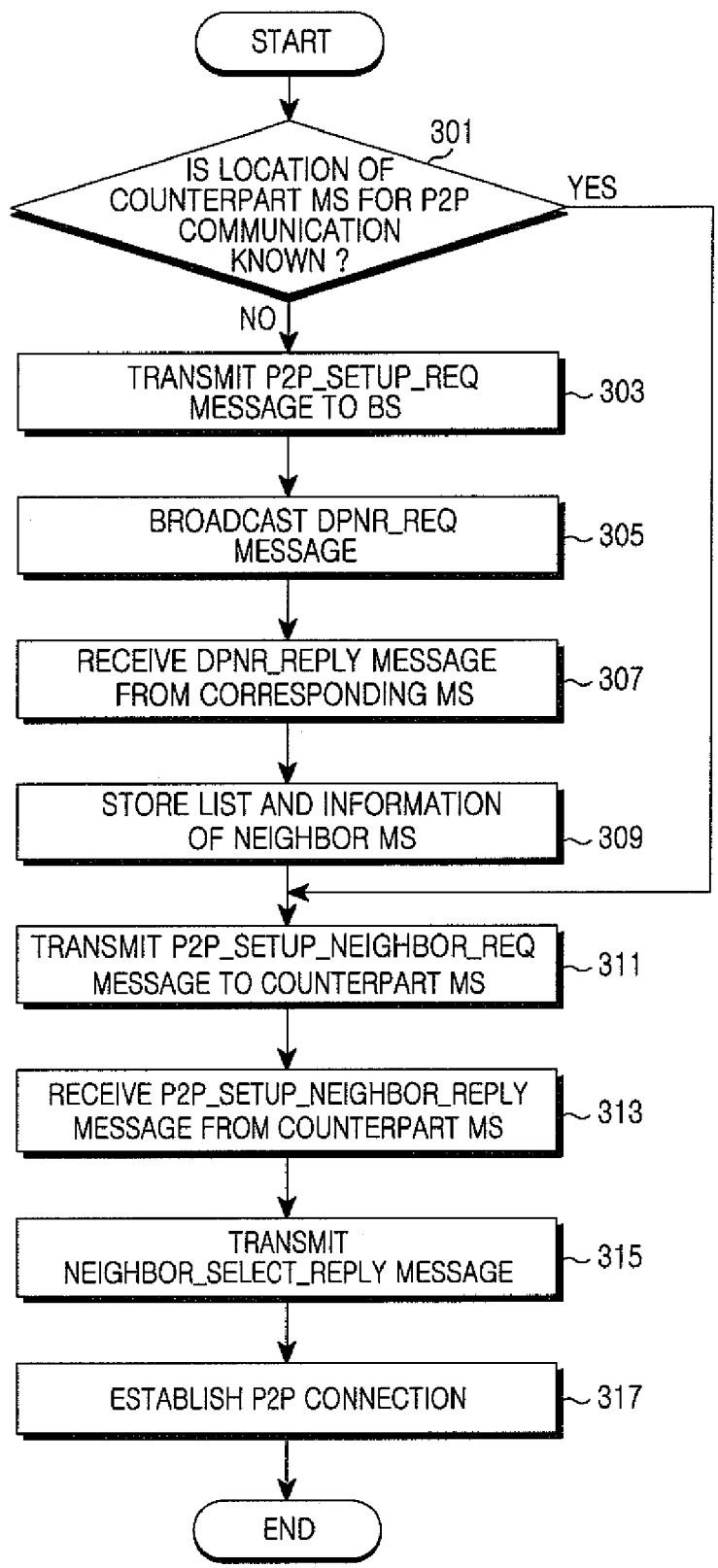
FIG. 3 is a flowchart illustrating an operation of an MS for establishing a P2P connection between MSs in a wireless communication system according to an exemplary embodiment of the present invention.

FIG. 3 is a flowchart illustrating an operation of an MS for establishing a P2P connection between MSs in a wireless communication system according to an exemplary embodiment of the present invention.

Referring to FIG. 3, a transmitting MS determines whether a location of a receiving MS is known in step 301. If the location of the receiving MS is known, the procedure proceeds to step 311. Otherwise, if the transmitting MS does not know the location of the receiving MS, the transmitting MS transmits a P2P_setup_req message to a BS in step 303 to begin finding the receiving MS.

In step 305, after transmitting the P2P_setup_req message, the transmitting MS broadcasts a DPNR_req message to gather information on its neighbor MSs. According to an exemplary embodiment, the transmitted DPNR_req message may be multicast.

In step 307, the transmitting MS receives a DPNR_reply message from the neighbor MSs which have received the DPNR_req message.

In step 309, the transmitting MS gathers information included in the DPNR_reply message and determines and manages a list of neighbor MSs located within a P2P communicable distance in the same cell. The DPNR_reply message contains a variety of information such as an indication of a transmit/receive power of each MS, a distance between a transmitting MS and a receiving MS capable of P2P communication, a presence/absence of required specific content, a required specific SW version, a telephone call reception state, etc.

In step 311, the transmitting MS determines whether the receiving MS is included in the list of the neighbor MSs located within the P2P communicable distance, and then transmits directly to the receiving MS a P2P_setup_neighbor_req message for requesting setup of the P2P connection.

In step 313, the transmitting MS receives a P2P_setup_neighbor_reply message.

In step 315, the transmitting MS transmits a neighbor_select_reply message to the BS.

In step 317, the BS allocates P2P resources to the transmitting MS, and then the transmitting MS establishes a P2P connection with the receiving MS.

Thereafter, the procedure of FIG. 3 ends.

Figure 4:
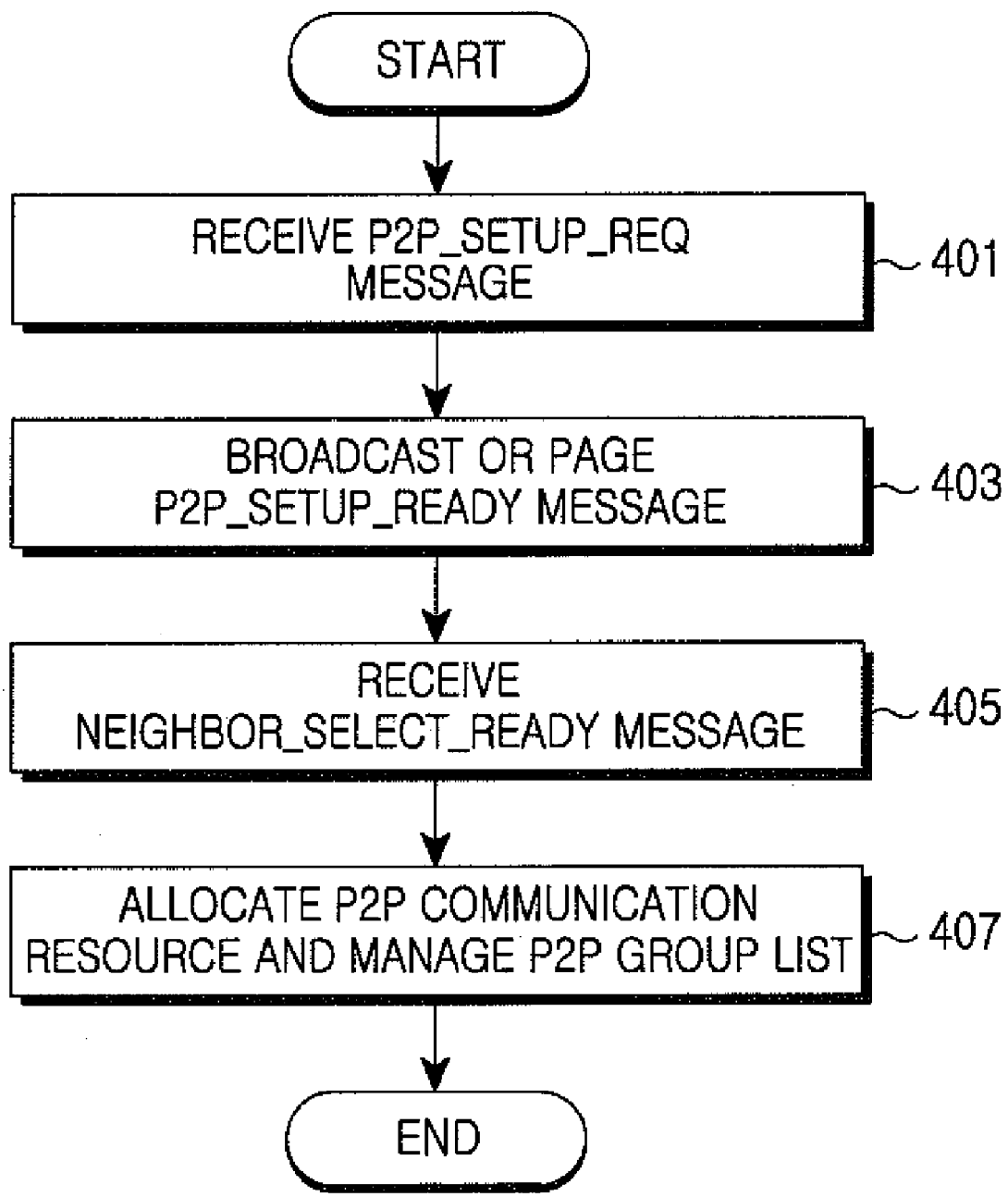
FIG. 4 is a flowchart illustrating an operation of a Base Station (BS) for establishing a P2P connection between MSs in a wireless communication system according to an exemplary embodiment of the present invention.

FIG. 4 is a flowchart illustrating an operation of a BS for establishing a P2P connection between MSs in a wireless communication system according to an exemplary embodiment of the present invention.

Referring to FIG. 4, the BS receives a P2P_setup_req message from a transmitting MS in step 401.

In step 403, the BS broadcasts or pages a P2P_setup_ready message to all MSs located within a service area of the BS so that these MSs are switched into a P2P active mode or P2P pre-active mode.

In step 405, the BS receives from the transmitting MS a neighbor_select_ready message containing information on neighbor MSs of the transmitting MS.

In step 407, the BS allocates resources so that P2P communication can be maintained between the transmitting MS and a receiving MS, and also manages a P2P group list.

Thereafter, the procedure of FIG. 4 ends.

Figure 5:
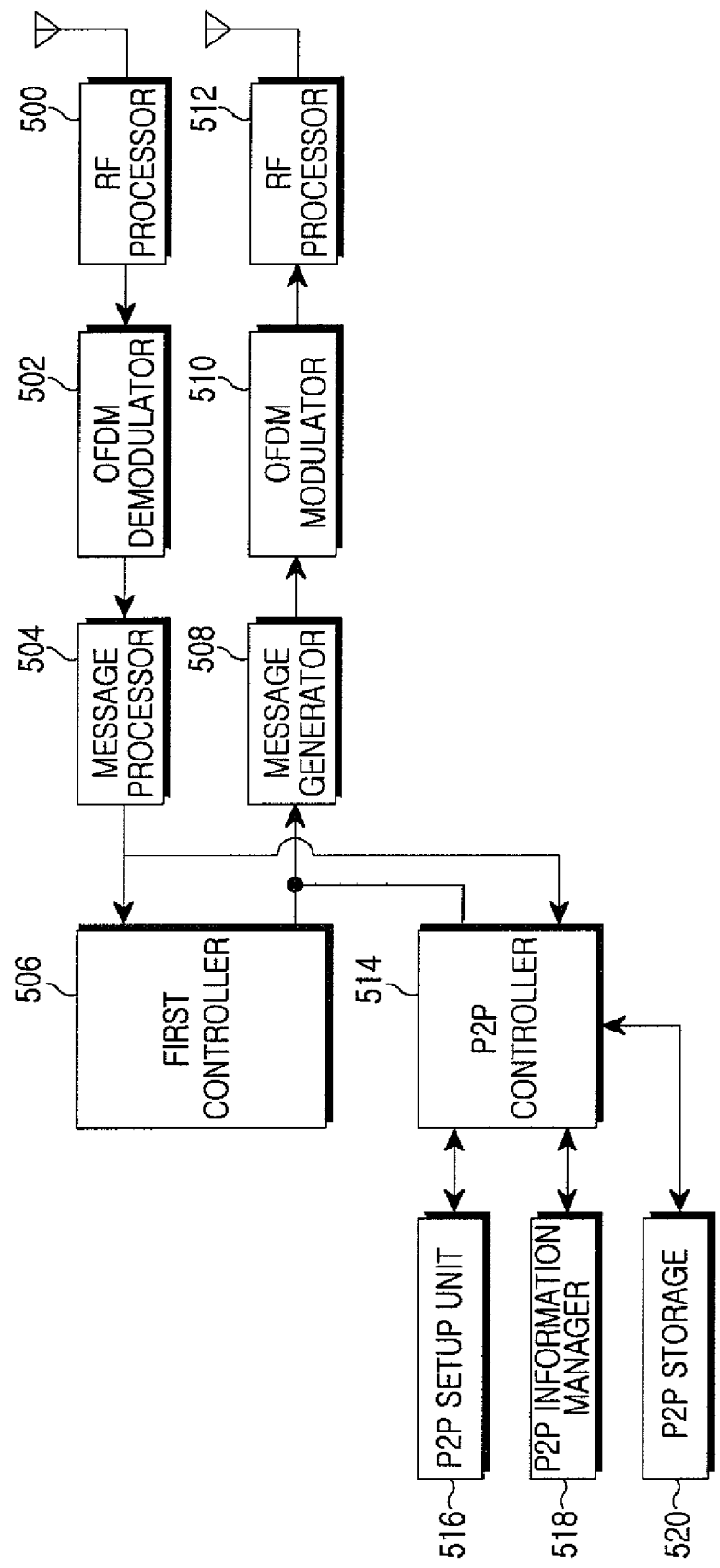
FIG. 5 is a block diagram illustrating an MS for establishing a P2P connection between MSs in a wireless communication system according to an exemplary embodiment of the present invention.

FIG. 5 is a block diagram illustrating an MS for establishing a P2P connection between MSs in a wireless communication system according to an exemplary embodiment of the present invention.

Referring to FIG. 5, the MS includes a Radio Frequency (RF) processor 500, an Orthogonal Frequency Division Multiplexing (OFDM) demodulator 502, a message processor 504, a first controller 506, a message generator 508, an OFDM modulator 510, an RF processor 512, a P2P controller 514, a P2P setup unit 516, a P2P information manager 518, and a P2P storage 520.

The RF processor 500 converts an RF signal received through an antenna into a baseband analog signal. The OFDM demodulator 502 converts the analog signal received from the RF processor 500 into sample data. Further, the OFDM demodulator 502 converts the sample data into frequency-domain data through a Fast Fourier Transform (FFT), and selects data of subcarriers to be received from the frequency-domain data. Furthermore, the OFDM demodulator 502 demodulates and decodes data according to a preset Modulation and Coding Scheme (MCS) level and outputs the data to the message processor 504.

The message processor 504 decomposes a control message received from the OFDM demodulator 502 and provides the decomposition result to the first controller 506. Further, in a state when being switched into a P2P communication mode, the message processor 504 decomposes a P2P control message received from the OFDM demodulator 502 and provides the decomposition result to the P2P controller 514. For example, the message processor 504 receives a DPNR_reply message containing information on neighbor MSs from the neighbor MSs and a P2P_setup_neighbor_reply message for requesting P2P setup from a transmitting MS and then processes the received message.

The first controller 506 performs a process suitable for information received from the message processor 504 and provides the result to the message generator 508. Further, in a state when being switched into the P2P communication mode, the P2P controller 514 performs a process suitable for P2P communication control information received from the message processor 504 and provides the result to the message generator 508.

The message generator 508 generates a message by using a variety of information received from the first controller 506 or the P2P controller 514 and outputs the generated message to the OFDM modulator 510 of a physical layer. For example, the message generator 508 generates a P2P_setup_req message for requesting P2P setup, a DPNR_req message for requesting information on neighbor MSs, a P2P_setup_neighbor_req message for requesting a receiving MS to perform P2P setup, and a neighbor_select_reply message for reporting information on neighbor MSs to a BS.

The OFDM modulator 510 codes and modulates data received from the message generator 508 according to the preset MCS level. Further, the OFDM modulator 510 converts the modulated data into sample data (i.e., an OFDM symbol) through an Inverse Fast Fourier Transform (IFFT). Furthermore, the OFDM modulator 510 converts the sample data into an analog signal and outputs the analog signal to the RF processor 512. The RF processor 512 converts the analog signal into an RF signal and transmits the RF signal through an antenna.

The first controller 506 may receive information, which is required when a general wireless communication protocol is processed through a mobile switching station or the BS, from an element of the physical layer or may generate a control signal to be delivered to the element of the physical layer. The first controller 506 can control and use a transmitter and a receiver in a Time Division Duplex (TDD) or Frequency Division Duplex (FDD) mode.

The P2P controller 514 may receive information, which is required when a P2P communication protocol is processed between MSs, from an element of the physical layer or may generate a control signal to be delivered to the element of the physical layer. The P2P controller 514 can also be used based on the TDD or FDD mode.

More specifically, in a P2P connection process, the P2P setup unit 516 establishes a P2P connection according to whether a location of the receiving MS is known. For example, if the location of the receiving MS is not known, the P2P setup unit 516 transmits the P2P_setup_req message to the BS to begin finding the receiving MS. In addition, if the location of the receiving MS is known, the P2P setup unit 516 transmits the P2P_setup_neigbor_req message to the receiving MS and thus attempts to setup a P2P connection with the receiving MS directly.

The P2P information manager 518 gathers information included in the DPNR_reply message received from corresponding MSs and checks and manages a list of neighbor MSs located within a P2P communicable distance in the same cell. The DPNR_reply message contains a variety of information indicating a transmit/receive power of each MS, a distance between a transmitting MS and a receiving MS capable of P2P communication, a presence/absence of required specific content, a required specific SW version, a telephone call reception state, etc. The DPNR_reply message is stored in the P2P storage 520.

In the aforementioned structure, the first controller 506 is provided as a protocol controller and controls the message processor 504, the message generator 508, the P2P controller 514, the P2P setup unit 516, and the P2P information manager 518. That is, the first controller 506 can function as the message processor 504, the message generator 508, the P2P controller 514, the P2P setup unit 516, and the P2P information manager 518. Although these elements are separately configured in the present invention, this separate configuration is for explanation purposes only. Thus, in practice, all or some of these elements may be controlled by the first controller 506.

Figure 6:
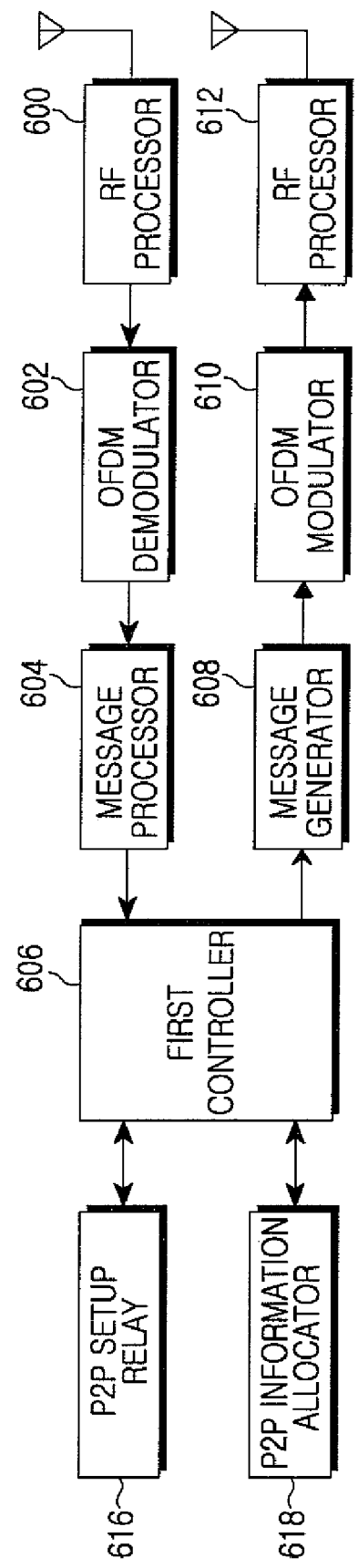
FIG. 6 is a block diagram illustrating a BS for establishing a P2P connection between MSs in a wireless communication system according to an exemplary embodiment of the present invention.

FIG. 6 is a block diagram illustrating a BS for establishing a P2P connection between MSs in a wireless communication system according to an exemplary embodiment of the present invention.

Referring to FIG. 6, the BS includes an RF processor 600, an OFDM demodulator 602, a message processor 604, a first controller 606, a message generator 608, an OFDM modulator 610, an RF processor 612, a P2P setup relay 616, and a P2P information allocator 618.

The RF processor 600, the OFDM demodulator 602, the message processor 604, the first controller 606, the message generator 608, the OFDM modulator 610, and the RF processor 612 have the same functions as described with reference to FIG. 5, and thus detailed descriptions thereof will be omitted.

More specifically, in a P2P connection process, upon receiving a P2P_setup_req message from a transmitting MS, the P2P_setup_relay 616 broadcasts or pages a P2P_setup_ready message to all MSs located within a service area of the BS so that these MSs are switched into a P2P active mode. The P2P_setup_req message received from the transmitting MS is processed by the message processor 604, and the P2P_setup_ready message is processed by the message generator 608.

The P2P information allocator 618 allocates resources so that P2P communication can be maintained between the transmitting MS and a receiving MS, and also manages a P2P group list.

In the aforementioned structure, the first controller 606 is provided as a protocol controller and controls the message processor 604, the message generator 608, the P2P setup relay 616, and the P2P information allocator 618. That is, the first controller 606 can function as the message processor 604, the message generator 608, the P2P setup relay 616, and the P2P information allocator 618. Although these elements are separately configured in the present invention, this separate configuration is for explanation purposes only. Thus, in practice, all or some of these elements may be controlled by the first controller 606.

According to exemplary embodiments of the present invention, a DPNR is used in a wireless communication system when a P2P connection is established between MSs. Thus, in an environment where a location of a receiving MS is not known, the receiving MS can be effectively found and thus the P2P connection can be established. Therefore, subscribers of P2P communication can be easily managed via a BS. In addition, since the receiving MS detects a P2P-related message only when the P2P connection is requested, power consumption can be reduced. In addition, since a transmitting MS can determine and manage a list of neighbor MS located within a P2P communicable distance in the same cell, a possibility of successful P2P communication can be increased.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for establishing a Peer-to-Peer (P2P) connection between a plurality of Mobile Stations (MSs), at least one of which is a transmitting MS and at least one of which is a receiving MS, in a wireless communication system, the method comprising:
   when a location of the receiving MS is not known, requesting, by the transmitting MS, a Base Station (BS) to transmit a message instructing MSs to prepare for a P2P setup, and thereafter, broadcasting to at least one neighbor MS a message requesting a P2P-related information;
   receiving, by the transmitting MS, the P2P-related information from each of the at least one neighbor MS;
   generating, by the transmitting MS, a list of MSs capable of P2P communication using the received P2P-related information; and
   establishing, by the transmitting MS, the P2P connection by selecting a receiving MS from the list of MSs with which P2P communication is desired.

2. The method of claim 1, wherein the establishing of the P2P connection comprises:
   requesting, by the transmitting MS, the selected receiving MS to perform P2P setup;
   receiving, by the transmitting MS, from the selected receiving MS a response message to the P2P setup request; and
   after receiving the response message, requesting, by the transmitting MS, the BS to allocate resources to maintain P2P communication.

3. The method of claim 1, wherein the P2P-related information comprises at least one of a transmit/receive power of each neighbor MS, a distance between the transmitting MS and a corresponding neighbor MS, a presence/absence of required specific content, and a required specific software version.

4. The method of claim 1, further comprising, when the location of the receiving MS is known by the transmitting MS, establishing the P2P connection directly with the receiving MS.

5. The method of claim 1, wherein the neighbor MSs are in a zone in which a signal from the transmitting MS can be directly received.

6. The method of claim 1, further comprising:
   after receiving from the BS the message instructing to prepare for P2P setup, receiving, by the receiving MS, the message requesting P2P-related information from the transmitting MS; and
   transmitting, by the receiving MS, the P2P-related information to the transmitting MS.

7. The method of claim 6, wherein the P2P-related information comprises at least one of a transmit/receive power of each neighbor MS, a distance between the transmitting MS and a corresponding neighbor MS, a presence/absence of required specific content, and a required specific software version.

8. The method of claim 6, wherein the establishing of the P2P connection further comprises:
   receiving, by the selected receiving MS, a P2P setup request that corresponds to a request to perform P2P setup from the transmitting MS;
   transmitting, by the selected receiving MS, a response message to the P2P setup request; and
   performing, by the selected receiving MS, P2P communication with the transmitting MS.

9. The method of claim 6, further comprising entering, by the receiving MS, into one of a P2P active mode and a P2P pre-active mode after the receiving from the BS the message instructing to prepare for P2P setup.

10. The method of claim 1, further comprising:
    broadcasting, by the BS, the message instructing MSs to prepare for P2P setup after receiving from the transmitting MS a message requesting transmission of the message instructing MSs to prepare for P2P setup;
    receiving by the BS, information on the selected receiving MS; and
    allocating, by the BS, resources for maintaining P2P communication between the transmitting MS and the selected receiving MS.

11. The method of claim 10, further comprising the BS generating a P2P group list by using the received information on the selected receiving MS.

12. A system for establishing a Peer-to-Peer (P2P) connection between a plurality of Mobile Stations (MSs) in a wireless communication system, the system comprising:
    a Base Station (BS); and
    a plurality of MSs, at least one of which is a transmitting MS and at least one of which is a receiving MS, each of the plurality of MS comprising:
    a P2P setup unit for broadcasting to at least one neighbor MS a message requesting a P2P-related information after requesting the BS to transmit a message instructing MSs to prepare for a P2P setup, when a location of the receiving MS is not known;

a P2P communication manager for receiving the P2P-related information from each of the at least one neighbor MS and for generating a list of MSs capable of P2P communication using the received P2P-related information; and an MS P2P controller for establishing the P2P connection by selecting a receiving MS from the list of MSs with which P2P communication is desired.

13. The system of claim 12, wherein the MS P2P controller requests the selected receiving MS to perform P2P setup, receives from the selected receiving MS a response message to the P2P setup request, and, after receiving the response message, requests the BS to allocate resources to maintain P2P communication.

14. The system of claim 12, wherein the P2P-related information comprises at least one of a transmit/receive power of each neighbor MS, a distance between the transmitting MS and a corresponding neighbor MS, a presence/absence of required specific content, and a required specific software version.

15. The system of claim 12, wherein, when the location of the receiving MS is known, the P2P controller establishes the P2P connection directly with the receiving MS.

16. The system of claim 12, wherein the at least one neighbor MS is in a zone in which a signal from the transmitting MS can be directly received.

17. The system of claim 12, wherein
the P2P setup unit receives the message requesting P2P-related information from the transmitting MS after receiving from the BS the message instructing to prepare for P2P setup, and transmits the P2P-related information to the transmitting MS, and the MS P2P controller establishes a P2P connection with the transmitting MS.

18. The system of claim 17, wherein the P2P-related information comprises at least one of a transmit/receive power of each neighbor MS, a distance between the transmitting MS and a corresponding neighbor MS capable of P2P communication, a presence/absence of required specific content, and a required specific software version.

19. The system of claim 17, wherein, in order to establish the P2P connection, the MS P2P controller controls to receive a request to perform P2P setup from the transmitting MS, to transmit a response message to the P2P setup request, and to perform P2P communication with the transmitting MS.

20. The system of claim 17, wherein the MS P2P controller controls to enter into one of a P2P active mode and P2P pre-active mode after the receiving from the BS the message instructing to prepare for P2P setup.

21. The apparatus system of claim 12, wherein the BS comprises;
the a P2P setup relay unit for broadcasting the message instructing MSs to prepare for P2P setup after receiving the message from the transmitting MS requesting transmission of the message instructing MSs to prepare for P2P setup,
a P2P information manager for receiving information on the selected receiving MS, and
a BS P2P controller for allocating resources for maintaining P2P communication between the transmitting MS and the selected receiving MS.

22. The system of claim 21, wherein the BS P2P controller generates a P2P group list by using the received information on the selected receiving MS.

* * * * *